United States Patent [19]

Rowden et al.

[11] Patent Number: 5,001,700
[45] Date of Patent: Mar. 19, 1991

[54] DISK CLAMP AND CENTERING APPARATUS FOR A BEAM ADDRESSABLE DISK DRIVE SYSTEM

[75] Inventors: David L. Rowden, Rochester, N.Y.; Patrick J. Champagne, Cupertino, Calif.; Gary R. Clauson, Colorado Spring, Colo.

[73] Assignee: Literal Corporation, Colorado Springs, Colo.

[21] Appl. No.: 331,421

[22] Filed: Mar. 30, 1989

[51] Int. Cl.⁵ .................................................. G11B 5/06
[52] U.S. Cl. ............................... 369/270; 369/269; 360/86; 360/99.05
[58] Field of Search .................. 360/97.01–97.04, 360/133, 99.12, 98.08, 99.01, 99.04, 99.05, 99.06, 105, 99.02, 86; 369/270, 77.2, 282, 133, 271, 75.2, 261, 111; 346/137

[56] References Cited

U.S. PATENT DOCUMENTS

| | | | |
|---|---|---|---|
| 3,898,814 | 8/1975 | Chou et al. | 360/99.05 X |
| 3,980,308 | 9/1976 | Camerik et al. | 369/111 X |
| 4,068,851 | 1/1978 | Yamamura | 369/269 X |
| 4,208,682 | 6/1980 | Bryer | 360/86 X |
| 4,232,870 | 11/1980 | Iemenschot | 360/86 X |
| 4,378,576 | 3/1983 | Roling | 360/99.12 X |
| 4,510,592 | 4/1985 | Kanamaru et al. | 369/270 |
| 4,570,194 | 2/1986 | Schatteman | 369/270 X |
| 4,613,968 | 9/1986 | Okita | 369/261 X |
| 4,802,158 | 1/1989 | Ogusu | 369/270 |
| 4,823,337 | 4/1989 | Van Zanten et al. | 369/270 |
| 4,847,826 | 7/1989 | Sakaguchi et al. | 369/270 |

FOREIGN PATENT DOCUMENTS 2909099  9/1980  Fed. Rep. of Germany.

Primary Examiner—Paul Ip
Attorney, Agent, or Firm—Kinney & Lange

[57] ABSTRACT

Apparatus for centering and clamping a disk on a spindle-drive is disclosed. A bistable magnetic clamp normally held in an axially offset position from the plane of the disk is preferentially drawn to a coupler washer on the spindle-drive when the spindle-drive and clamping device are relatively moved toward each other after the disk is inserted into the drive. To accommodate significant initial misalignment of the disk, as might typically occur with a cartridge mounted disk, in a very short throw clamping motion, a multi-frustrum centering member is used. The frustrum surface nearest the disk has a gradual slope assuring meshing of the centering member with the central aperture of the disk over a wide range of initial misalignment. Once the disk is coarsely centered, precision centering is achieved during the final clamping stage by the second frustrum surface which is at steep slope relative to the plane of the disk.

5 Claims, 2 Drawing Sheets

DISK CLAMP AND CENTERING APPARATUS FOR A BEAM ADDRESSABLE DISK DRIVE SYSTEM

FIELD OF INVENTION

This invention relates to the field of beam addressable disk drive systems and more particularly to apparatus for positioning and clamping disks on a disk drive spindle.

BACKGROUND OF INVENTION

Beam addressable disk drive systems, e.g. optical and magneto-optical information storage systems, typically require provision for positioning and clamping a removable and replaceable information storage disk on a spindle drive such that the central aperture of the disk is firmly held in precise coaxial relationship with the spindle axis. Precision centering of the disk relative to the spindle axis of rotation is important to minimize runout (eccentric rotation) which can unduly stress the tracking servo of the drive system.

An example of a general type of disk centering and clamping apparatus is shown in German Offenlegengschrift 29 09 099, published Sept. 11, 1980, a magnetic clamping device for a video or audio disk record player employs a free-floating ferromagnetic clamping ring mounted for axial movement in a disk receiving slot of a hinged cover. The clamping ring is held offset from the disk slot by means of a low strength magnet fixedly mounted on the upper surface of the cover. When the cover, with a disk positioned in the slot, is rotated down to place the disk on the spindle-drive, the clamping ring is attracted away from the low strength magnet toward a higher strength magnet positioned in the spindle on the other side of the disk thus clamping the disk to the spindle drive. When the cover is later opened, the clamping ring is pulled by the disk away from the spindle-drive magnet and attracted to the cover magnet thus allowing the disk to be removed from the cover. A retainer keeps the clamping ring with the cover when the cover is closed and opened with no disk in place in the cover. A constant diameter spindle post with a chamfered end is used for centering the disk as the cover is closed over the spindle-drive.

In U.S. Pat. No. 4,570,194 issued Feb. 11, 1986, a computer optical disk is inserted in a fixed slot until the disk central aperture is centered under a bistable magnetic clamp mounted in the slot cover. An axially movable, annular, non-magnetic clamping device which houses an internal annular magnet is held levitated above the disk slot within a fixed annular ferromagnetic ring. After a disk is inserted into the slot, the spindle-drive comprised of a ferromagnetic turntable is raised into engagement with the disk causing the flux from the levitated magnet to change direction from the levitating ring into the turntable drive. This, in turn, attracts the clamp to the turntable thus clamping the disk to the spindle-drive. When the spindle-drive is lowered, the flux reverts to the annular ring, levitating the clamp and allowing removal of the disk. This disclosure also relies on a constant diameter spindle post with a chamfered end to center the disk on the drive.

In both of the foregoing representative disclosures, no provision is made for assuring highly precise centering of the disk on the spindle-drive since the central aperture of the fully seated disk is positioned about the vertical surface of a constant diameter spindle post. Proper centering in this case is a function of assuring a close tolerance fit between the post and the disk aperture, at best a costly approach that can result in deteriorated performance with long term wear on the disk central aperture.

U.S. Pat. No. 4,510,592, issued Apr. 9, 1985, is representative of improved centering arrangements in the art in which the disk central aperture is centered on the frustro-conical surface of a centering member mounted on the spindle-drive. In this patent, a video disk is placed on a spindle-drive and a clamping device placed over the spindle. The spindle-drive includes a spring loaded, frustro conical centering member which is mounted for axial movement on the spindle inside the circumference of a disk drive turntable which is also mounted on the spindle. An independent, spring-loaded stabilizing ring is positioned between the centering member and turntable to hold the disk parallel to the turntable surface as the disk is being centered by the member in the process of clamping the disk to the turntable. A magnet in the centering member cooperates with a ferromagnetic coupler ring in the clamping device to hold the disk firmly on the turntable. Any tolerance or wear variations in the diameter of the disk central aperture are accommodated by the spring loading of the centering member which assures positive seating of the disk on the turntable drive surface with full contact by the disk aperture around the conical surface of the centering member. In this disclosure, the disk and clamping device apparently are both manually inserted on the spindle-drive. As a consequence, the user can visually determine that the disk is correctly placed on the conical surface of the centering member before placing the clamping device on the spindle.

It is known to protect sensitive surfaces of optical and magneto-optical disks by enclosing the disks in protective cartridges. In order to permit free rotation of the disk in the cartridge, the internal cavity of the cartridge is significantly larger than the disk, although a retaining mechanism may be provided within the cartridge to keep the disk from rattling about when the cartridge is outside of the disk drive system. The retaining mechanism is typically released when the cartridge is inserted into the drive with the result that the disk can move laterally within the cartridge by a significant amount and thus not be aligned with the conical surface of the centering member when a self-actuating disk clamping mechanism attemps to clamp the disk onto the spindle-drive.

It is therefore an object of the invention to provide an improved disk centering and clamping apparatus that will accommodate substantial latitude in the initial radial position of the disk when clamping occurs while at the same time insuring that the disk is accurately and precisely centered in its clamped position as is required by optical and magneto-optical disk drive systems.

It is another object of the invention to provide low cost, compact disk positioning and self-actuated clamping apparatus that quickly and reliably repositions and precisely centers a disk that may be substantially misaligned inside a protective cartridge upon insertion into the drive system.

SUMMARY OF INVENTION

Thus in accordance with the invention, disk centering and clamping apparatus is provided for a disk drive system adapted to receive a beam addressable information storage disk at a disk operative position, the disk having a central drive aperture. In a preferred embodiment of the invention, the apparatus comprises (a) a spindle-drive including a spindle having an axis of rotation normal to the disk surface, (b) a disk drive member mounted on the spindle and having a disk engaging drive surface coaxial with the spindle axis and (c) a disk centering member positioned on the spindle coaxially with the rotational axis of the spindle. According to a particular feature of the invention, the centering member has a multi-frustrum surface, with the surface of a first frustrum closest to the disk having a gradual slope relative to the plane of the disk and the surface of a second frustrum farthest from the disk having a steep slope relative to the plane of the disk. The apparatus further includes means for clamping the disk to the disk drive member with the central aperture of the disk centered on the second surface of the centering member. With the arrangement as described, during the initial stages of the clamping action, the misaligned disk is quickly moved laterally (radially of the spindle) down the first gradually sloped frustrum surface in a very short span of axial movement. Consequently, an initially grossly misaligned disk can be accommodated. Once having reached the second (last) frustrum surface, the disk has been centered to a close approximation and now, as it continues down the steep slope of the second surface in the final stage of clamping, the disk is centered with a high degree of precision. Preferably, the centering member is spring loaded to accommodate any tolerance and wear variations in the diameter of the disk's central aperture.

Further in accordance with a feature of the invention, a presently preferred clamping device includes a clamp retainer mount, a non-magnetic annular disk clamp member captured within the retainer and freely movable axially and rotationally therein, the clamp member having an extended surface adapted for clamping engagement with the disk. A pair of annular magnets with a flux shorting ring positioned therebetween are captured within and coaxial with the annular clamp member, the magnets and clamp member being adapted for axial alignment with the spindle-drive when the disk is inserted. A magnetic flux-supporting metallic plate is positioned on the opposite side of the clamp member from the disk and an annular ferromagnetic coupler ring is positioned on the spindle-drive. Preferably, the strength of the magnet closest to the metallic plate is lower than that of the magnet closest to the spindle-drive. Thus, when the clamping device and spindle-drive are separated to allow insertion and withdrawal of the disk, the clamp member is attracted to the metallic plate free of contact with the disk. When the spindle-drive and clamping device are relatively moved together after the disk is inserted, the higher strength magnet causes the clamp member to be preferentially attracted to the spindle thereby resulting in a self-actuating clamp device that clamps the disk onto the disk engaging surface of the disk drive member.

DETAILED DESCRIPTION

Figure 1:
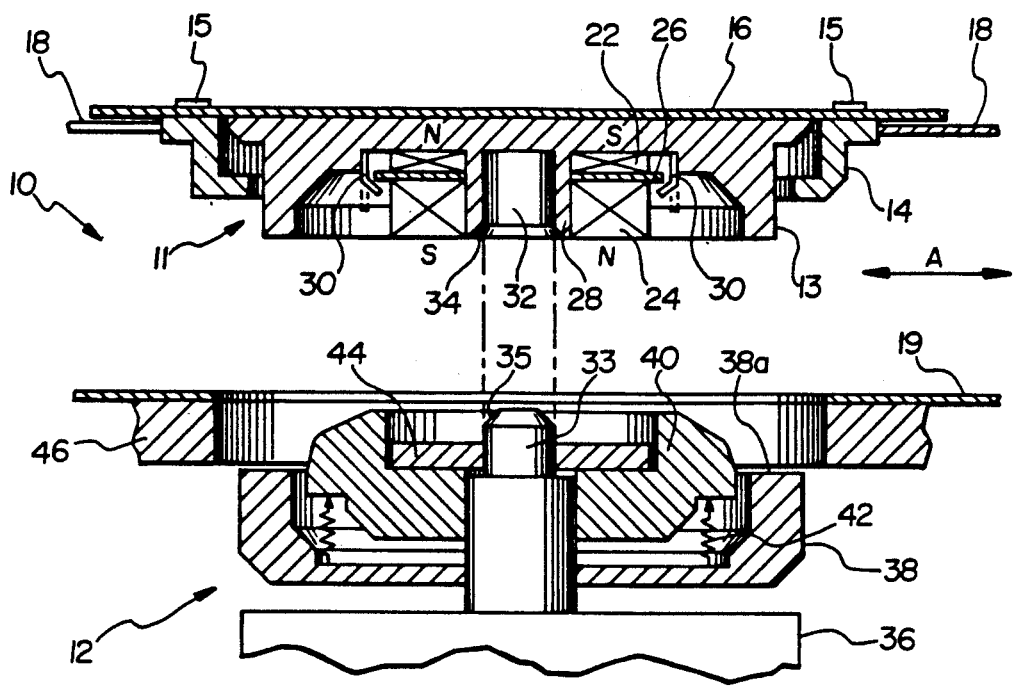
FIG. 1 is a side view in cross section of a portion of a disk drive system illustrating the disk centering and clamping apparatus of the invention shown in the open condition allowing insertion and withdrawal of disk.

Referring now to FIG. 1, there is shown a presently preferred embodiment of the disk centering and clamping apparatus 10 of the invention which comprises a clamping device 11 and a spindle-drive 12. Clamping device 11 is comprised of an annular clamping member 13 which is loosely captured for axial and rotational movement by a retainer 14 mounted by holding tabs 15 to a metallic plate 16. Plates 18 and 19 define a space in the disk drive system for receiving and holding a disk cartridge 20 (FIG. 2) inserted and withdrawn along a path shown by double arrow A. A pair of annular magnets 22, 24 separated by a washer-shaped flux shorting ring 26 are held coaxially in clamp 13 about a center post 28 by means of retainer tabs 30 crimped onto washer 26. Center post 28 has a central bore 32 of a diameter just slightly larger than the diameter of spindle 33 of spindle-drive 12. Bore 32 is provided with a chamfered opening 34 which cooperates with the chamfered end 35 of spindle 33 during the self-actuated clamping function to center the clamp on the spindle-drive. Magnets 22, 24 have north-south poles disposed about their circumstances as shown in the drawing and preferably magnet 22 has a lower magnetic strength than magnet 24.

Spindle-drive 12 includes spindle 33 rotationally driven by drive motor 36. An annular disk drive member 38 is secured coaxially at a fixed position on spindle 33 while an annular centering member 40 is coaxially mounted on spindle 33 and is movable axially on the spindle. A helical compression spring 42 urges centering member 40 upward in the drawing toward clamping device 11. A washer-shaped coupler ring 44, preferably consisting of a ferromagnetic material, is fixedly secured coaxially on the upper end of spindle 33 and serves, in part, to retain member 40 on spindle 33. In the disk clamped position of FIG. 2, ring 44 also serves as a flux return path for magnet 24. To allow the unimpeded insertion and withdrawal of the disk cartridge 20, spindle-drive 12 is held in a first position below guide plate 19 on central mount plate 46 of the disk drive system by means of a lift mechanism (not shown).

Figure 3:
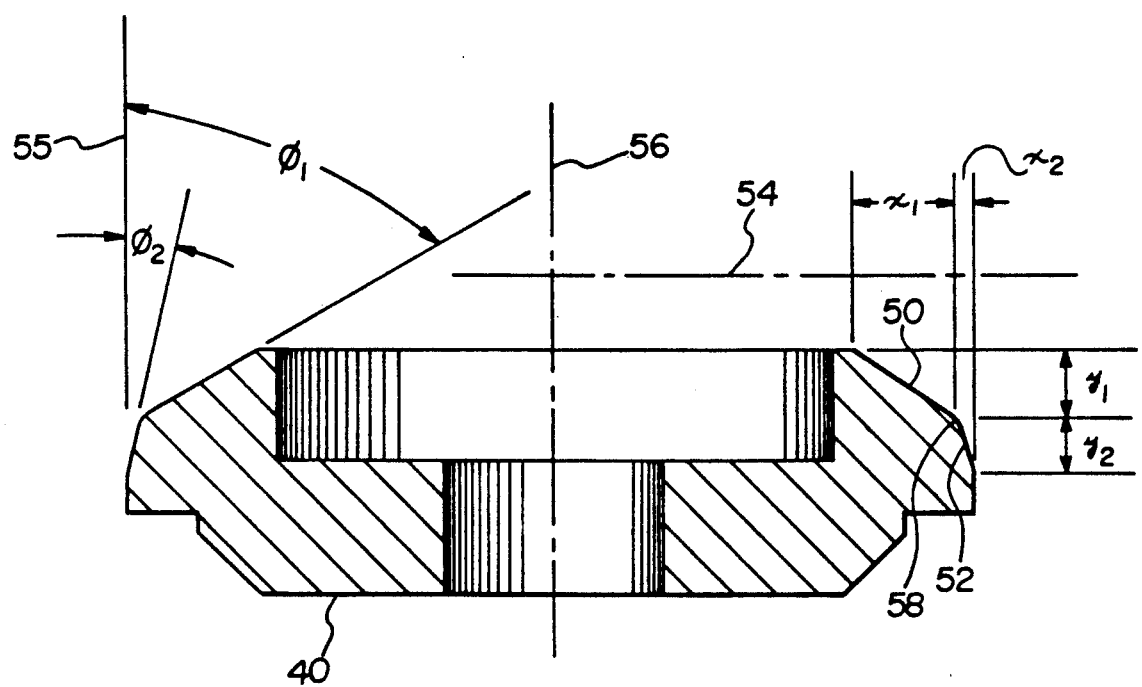
FIG. 3 is a side view in cross section of the centering member embodied in the apparatus in FIG. 1.

Referring to FIG. 3, centering member 40 is shown in greater detail and includes an upper surface comprised of a pair of frustrum surfaces 50 and 52. First frustrum surface 50 has a gradual slope relative to the plane of the disk in its operative position as represented by phantom line 54. Second frustrum surface 52, on the other hand, is seen as having a steep slope relative to the disk plane. The slope of frustrum surface 50, as defined by a line revolving about the axis of rotation 56 of the spindle-drive 12 at an angle $\phi_1$ (shown with reference to line 55 parallel to line 56), is preferably between 55° and 65° and most preferably about 62°. Second frustrum surface 52, similarly defined by a line revolving about axis 56 at an angle $\phi_2$ (shown relative to line 55), is preferably between 10° and 20° and most preferably about 15°. In order to facilitate the sliding movement of the disk from surface 50 to surface 52, the circumferential line of transition 58 between the two frustrum surfaces 50 and 52 is preferably rounded off.

Figure 2:
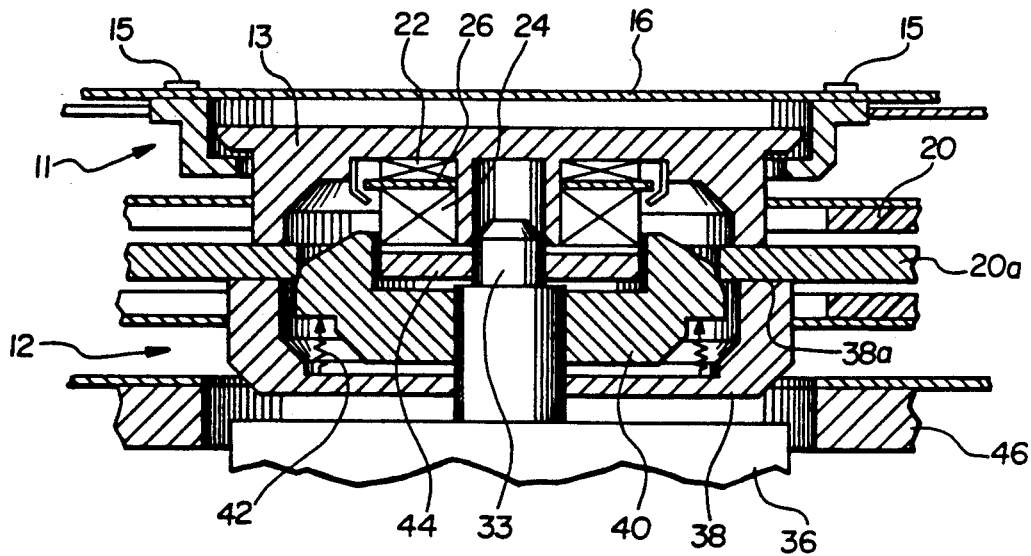
FIG. 2 is the same view of the apparatus of FIG. 1 showing the disk cartridge inserted and the disk clamped to the spindle-drive.

In FIG. 2, the disk clamp and centering apparatus 10 is shown after a disk cartridge 20 with an enclosed disk 20a has been inserted. Once the cartridge has been inserted into place, the lift mechanism is activated to raise spindle-drive 12 into the space between plates 18 and 19. Initially, disk 20a may be located somewhat randomly within the confines of the inner cavity of cartridge 20. It will be appreciated that when cartridge 20 is outside of the disk drive system, disk 20a may normally be held stationary within the cartridge by a brake mechanism to keep the disk from rattling about and becoming damaged. However, this brake mechanism is preferably released as the cartridge is inserted into the drive by means of a brake release tab (not shown) in the disk drive system. Thus, though the cartridge may be precisely positioned, the disk is often radially offset by a significant amount as the brake release is activated. As can be seen in FIG. 3, the gradual slope of frustrum 50 assures that centering member 40 will mesh with the central disk aperture over a relatively wide range of initial misalignment $x_1$ and is quickly moved over a short span of vertical motion $y_1$ to an approximately centered position during the initial stages of the clamping process. In the final stages of the clamping process, after disk 20a has been approximately centered by the first frustrum surface 50, the central aperture of the disk rides down the steep frustrum surface 52 moving radially over a short span $x_2$ for vertical span $y_2$ so as to be centered precisely as the clamp 13 urges the disk against the disk engaging surface 38a of disk drive member 38. Positive seating of disk 20a on surface 38a is assured irrespective of any tolerance or wear variations in the diameter of the disk central aperture by the yielding of centering member 40 against the force of compression spring 42.

Considering now the self-actuating operation of clamping device 11, as spindle-drive 12 is lifted into engagement with disk 20a, going from the position in FIG. 1 to that of FIG. 2, coupler ring 44 is brought into the influence of the magnetic field of magnet 24. Since the strength of magnet 24 is greater than that of magnet 22, the attraction of magnet 24 to coupler ring 44 is stronger than that between magnet 22 and the metal plate 16 on which the clamping device is mounted. The stronger attraction force operates to pull movable clamp 13 away from plate 16 and forces clamp 13 to press the central aperture region of disk 20a onto disk engaging surface 38a of drive member 38.

When the cartridge 20 is to be withdrawn from the disk drive system, the lift mechanism is actuated to move spindle-drive 12 downward away from disk 20a which removes the attraction force between magnet 24 and coupler ring 44 thus allowing the attraction force between magnet 22 and plate 16 to pull clamp 13 up against plate 16 in a position offset axially from disk 20a. By using a cartridge design with an access opening that extends from the center out to the edge of the cartridge, it is not necessary for clamp 13 to clear the cartridge completely but only that enough clearance between clamp 13 and disk 20a be provided to allow the cartridge to be moved without interference between the clamp 13 and disk 20a. Once spindle-drive 12 has been lowered out of the space between guide plates 18 and 19, the cartridge can be withdrawn.

The invention has been described in detail with particular reference to a presently preferred embodiment, but it will be understood that variations and modifications can be effected within the spirit and scope of the invention.

What is claimed is:

1. Disk centering and clamping apparatus for a disk drive system which receives a beam addressable information storage disk, the disk having a central drive aperture, the apparatus comprising:

a spindle-drive including (a) a spindle having an axis of rotation normal to the plane of the disk, (b) a disk drive member mounted on the spindle and having a disk engaging drive surface coaxial with the spindle axis, (c) a disk centering member positioned on said spindle coaxially with said axis of rotation, said centering member having a major surface facing the disk with a first frustro-conical surface closer to the disk having a gradual slope relative to the disk of between about 55° and 65° relative to the spindle axis and a second frustro-conical surface further from the disk having a steep slope relative to the plane of the disk of between about 12° and 18° relative to the spindle axis; and means for clamping the disk to the disk drive member with the central aperture of the disk centered on the second frustro-conical surface of the centering member.

2. Disk centering and clamping apparatus of claim 1 in which said first and second frustro-conical surfaces have slopes relative to the spindle axis of about 62° and 15°, respectively.

3. Disk centering and clamping apparatus of claim 1 or 2 in which the major surface of said centering member includes a line of transition between said first and second frustro-conical surfaces which is slightly rounded to facilitate sliding motion of the central aperture of the disk from the first to the second frustro-conical surface as the disk is being clamped toward said disk engaging surface of the disk drive member.

4. Disk clamp and centering apparatus for a disk drive system for receiving a disk inserted to an operative position, and having a disk spindle-drive located on one side and a clamping device located on the other side of the inserted disk, said spindle-drive and clamping device being relatively movable toward and away from each other when the disk is inserted and removed, the apparatus comprising:

a clamping device having (a) a first support housing, (b) a second annular housing captured within said first housing and freely movable axially and rotationally therein, said second housing having an extended surface for clamping engagement with said disk, (c) a magnetic flux-supporting metallic plate positioned opposite of the second housing from the disk operative position, (d) first and second annular magnets captured in said second housing and being in axial alignment with said spindle when the disk is in its operative position and (e) a flux shorting ring intermediate said first and second annular magnets and axially aligned therewith, the magnetic strength of the first magnet which is closer to the metallic plate being lower than that of the second magnet which is closer to the disk operative position; and spindle-drive means including a motor-driven spindle and a disk drive member mounted on said spindle for rotationally driving said disk, said spindle-drive means having a disk centering member and a ferromagnetic coupler ring coaxially mounted on said spindle;

whereby said clamp member is maintained offset away from the disk operative position by the magnetic attraction of said first magnet to said metallic plate until a disk is inserted and the spindle-drive and the clamping device are relatively moved toward each other whereupon said clamp member is preferentially drawn to the coupler ring by the relatively stronger magnetic attraction of said second magnet to the coupler ring thereby clamping the disk to the spindle-drive.

5. Disk clamp and centering apparatus according to claim 4, in which said spindle-drive includes an annular drive member having on annular disk-engaging surface and fixedly secured coaxially to said spindle, in which said centering member is movable axially on said spindle and has a major surface facing said disk central aperture comprising a pair of frustro-conical surfaces, the first of which is nearest the disk and has a slope of between about 55° and 65° relative to the spindle axis, the second of which is nearest the disk engaging surface of the disk drive member and has a slope of between about 12° and 18° relative to the spindle axis, in which said spindle-drive further includes springs means for compliantly urging said centering member in the direction of said disk central aperture and in which said ferro-magnetic coupler ring is fixedly secured to the spindle near the end thereof facing the disk and is positioned to retain the centering member on the spindle against the compliant force of said compression spring;

and whereby any radial offset of said disk central aperture from the spindle axis is first coarsely corrected by engagement of the central aperture of the disk with said first frustro-conical surface followed by precision centering of said disk by engagement of said disk central aperture with said second frustro-conical surface as said disk is clamped to said drive engaging surface of said drive member.

* * * * *